United States Patent [19]

Shaffer

[11] 4,100,739
[45] Jul. 18, 1978

[54] PRESSURE SENSITIVE CHARGING MEANS FOR A STEERING SYSTEM

[75] Inventor: Walter Moore Shaffer, Peoria, Ill.

[73] Assignee: Caterpillar Tractor Co., Peoria, Ill.

[21] Appl. No.: 833,898

[22] Filed: Sep. 16, 1977

Related U.S. Application Data

[63] Continuation of Ser. No. 759,953, Jan. 17, 1977, abandoned.

[51] Int. Cl.² .......................... F15B 1/02; F15B 11/16
[52] U.S. Cl. ........................................ 60/413; 60/418; 60/423; 60/433; 60/484; 60/DIG. 2
[58] Field of Search ................. 60/413, 418, 423, 433, 60/468, 484, DIG. 2, 403, 409; 91/41, 42, 468; 137/115

[56] References Cited

U.S. PATENT DOCUMENTS

| | | | |
|---|---|---|---|
| 2,330,739 | 9/1943 | Piron | 60/418 X |
| 2,392,471 | 1/1946 | Fox | 60/418 X |
| 2,968,927 | 1/1961 | Quayle | 60/418 X |
| 3,014,344 | 12/1961 | Arnot | 60/433 |
| 3,083,533 | 4/1963 | Schenkelberger | 60/415 |
| 3,170,536 | 2/1965 | Van House et al. | 180/82 |
| 3,274,779 | 9/1966 | Klein | 60/413 X |
| 3,439,768 | 4/1969 | Medley | 180/79.2 |
| 3,570,519 | 3/1971 | Bianchetta | 137/101 |
| 3,640,301 | 2/1972 | Jania | 137/101 |
| 3,911,679 | 10/1975 | Matthews | 60/413 |

Primary Examiner—Edgar W. Geoghegan
Attorney, Agent, or Firm—Wegner, Stellman, McCord, Wiles & Wood

[57] ABSTRACT

An improved pressure sensitive valving arrangement is provided for a power steering unit for a lift truck, and in particular for a battery powered lift truck. To the conventional implement valve is added an accumulator charging means which includes an additional valve, herein called a "blocking or control valve", which additional valve is downstream from the implement valve and which additional valve, when actuated, blocks the flow of fluid through the implement valve to thereby build up pressure for charging an accumulator. The blocking valve includes a blocking spool which operates against a pressure-actuated pilot plunger such that when the pressure in the accumulator reaches or exceeds a predetermined amount, the pilot plunger shifts the blocking spool to permit the fluid to again flow through the implement valve. The blocking spool is actuated by a force acting on a control member associated with the lift or tilt levers, or may be actuated independently by a mechanism responsive to reduced pressure in the accumulator. The pressure-responsive mechanism shifts the blocking spool to a blocking position to charge the accumulator whether or not one of the lift or tilt implement actuators has been in use and has been returned to its neutral position.

22 Claims, 5 Drawing Figures

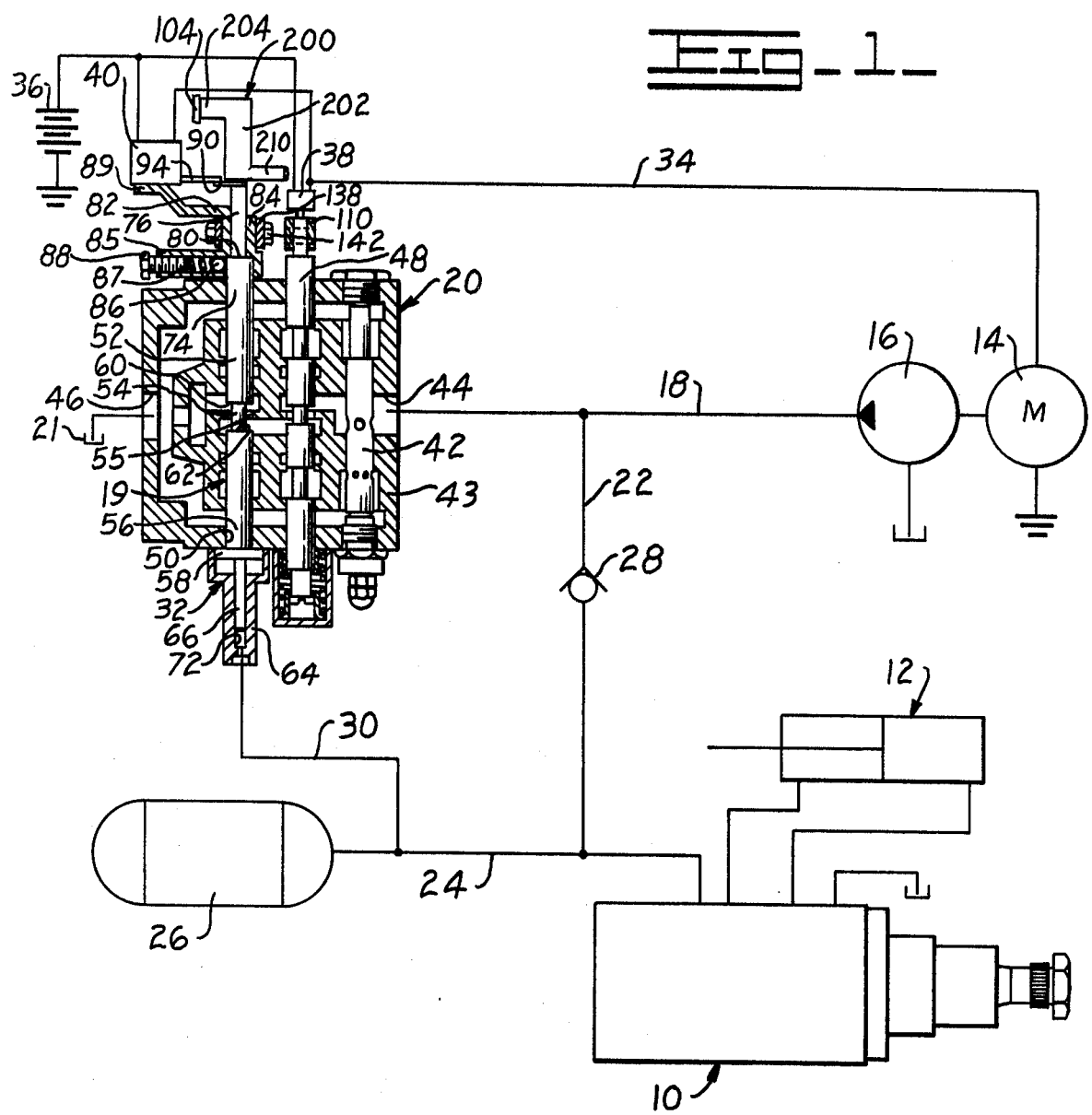

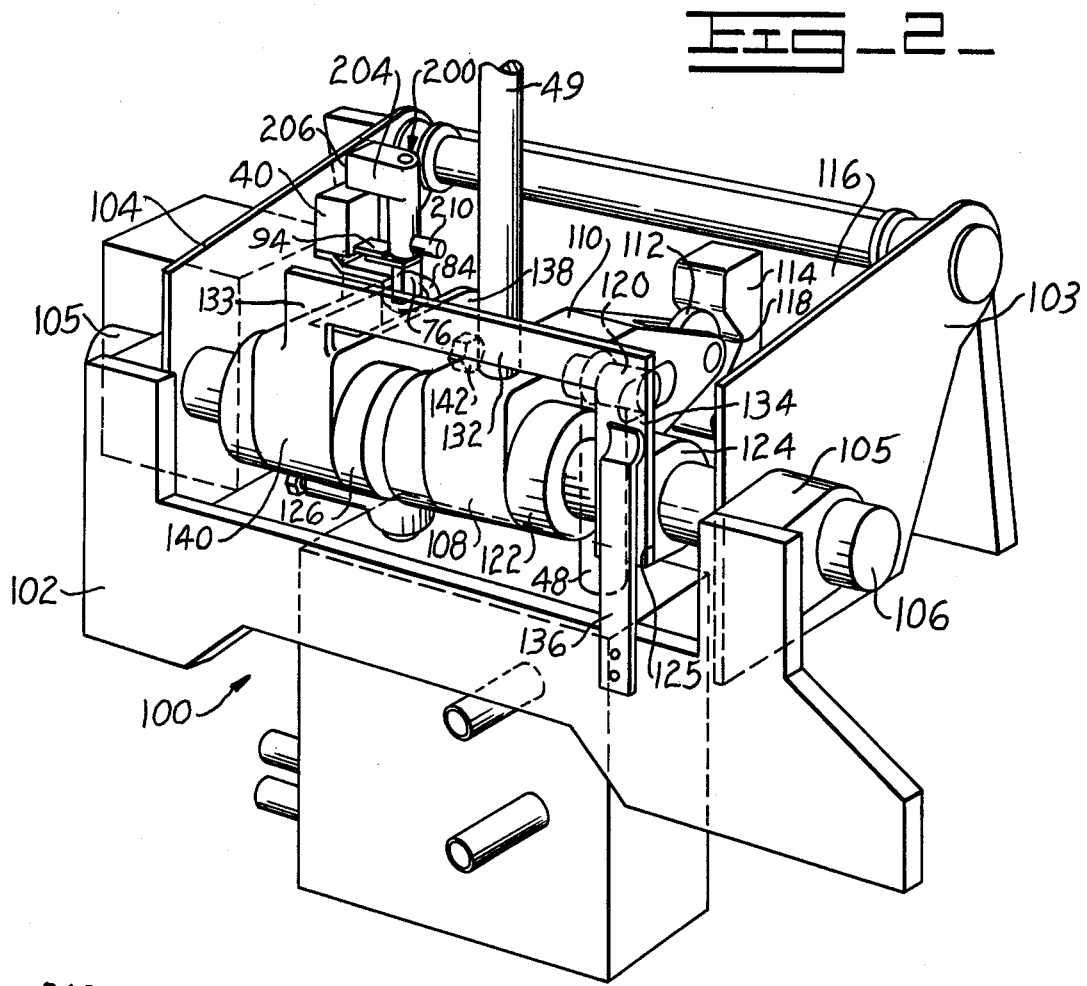
Fig_2_
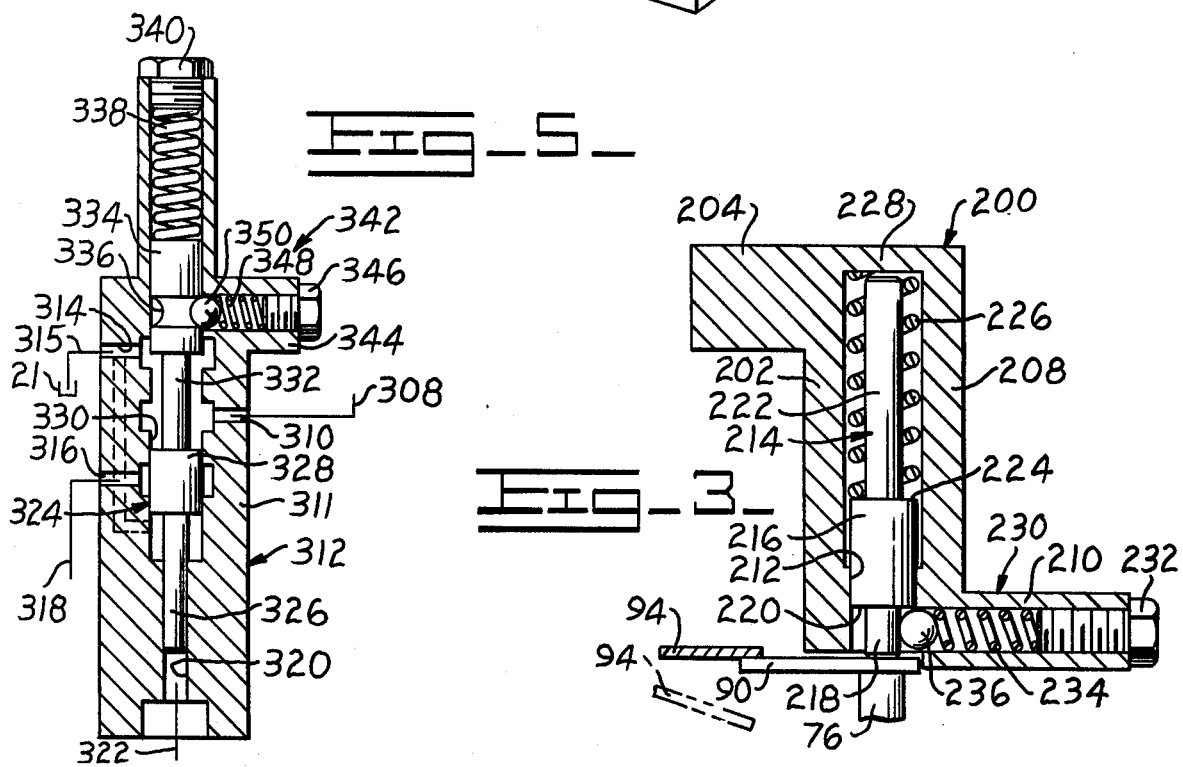
Fig_5_
Fig_3_

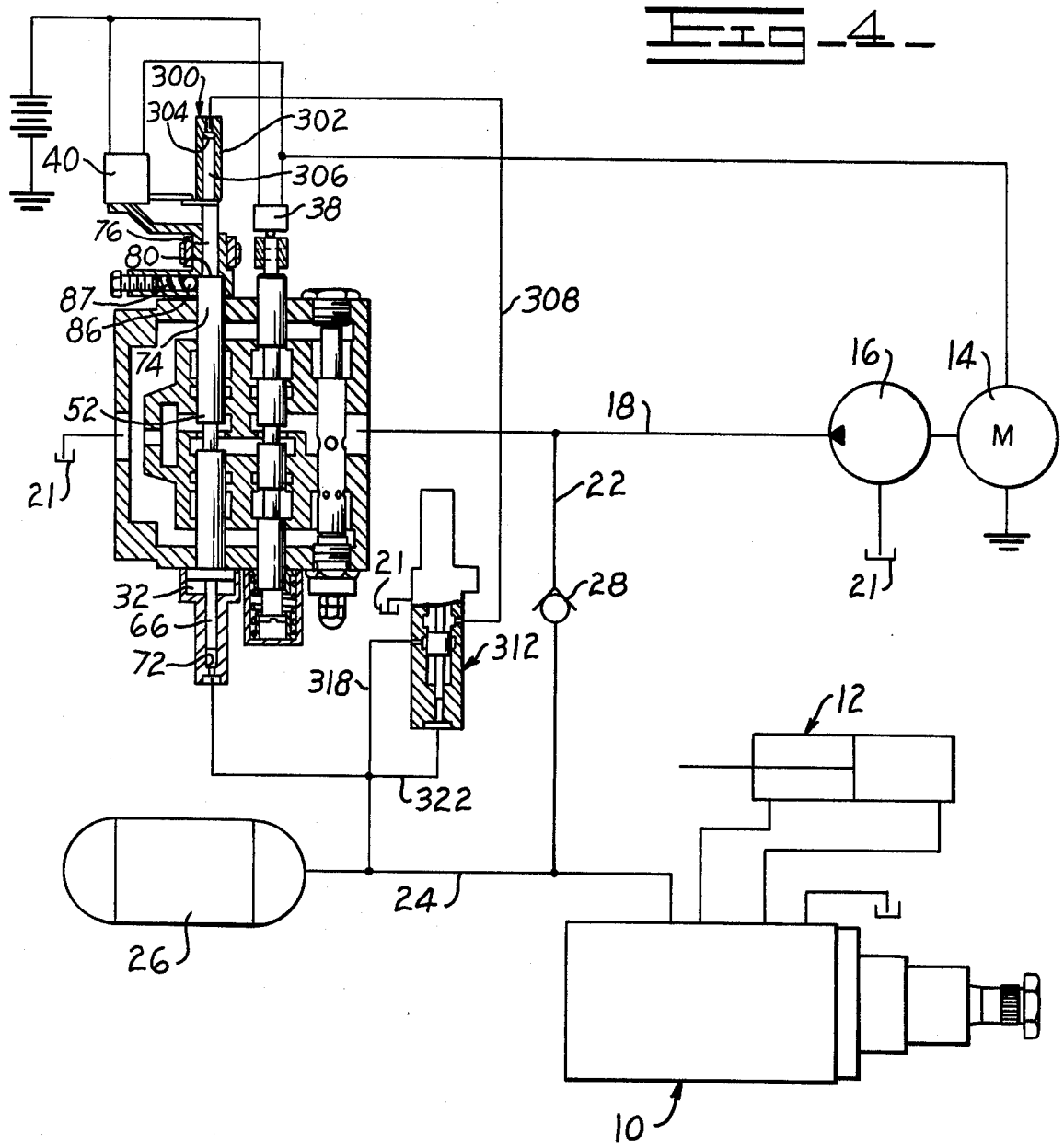

PRESSURE SENSITIVE CHARGING MEANS FOR A STEERING SYSTEM

This is a continuation, of application Ser. No. 759,953 filed Jan. 17, 1977 now abandoned.

BACKGROUND OF THE INVENTION

1. Field of the Invention

This invention relates to lift trucks, and more particularly to a motor-driven hydraulic system for a power steering unit of a battery powered lift truck.

2. Description of the Prior Art

Lift trucks, and in particular higher volume range battery powered lift trucks, have generally not made use of power steering units because of the high costs of installing and operating such units and because of the heavy drain on the power of the battery.

Part of the expense is the requirement of an additional electric motor and its controls for use just for power for the power steering unit. When the vehicle is in operation, the additional electric motor and pump must be driven at full speed at all times, whether or not there is a demand for the fluid for steering purposes. It is necessary that the continuous pumping of oil through the open center power steering unit be maintained readily available for instant steering. The additional electric motor and pump affects approximately a ten percent drain on the battery capacity for the purposes of operating the power steering unit.

SUMMARY OF THE INVENTION

A power steering system has a closed center hydrostatic steering unit, an implement valve, a blocking valve, an implement pump, a motor and an accumulator. The motor-driven implement pump is connected to the implement valve and blocking valve and, through a check valve, to the accumulator and to the hydrostatic steering unit. The accumulator is connected to a pilot plunger on the blocking valve, which pilot plunger is associated with a blocking spool in said blocking valve. An implement lever is operatively connected to a control member which is operatively connected to the blocking spool such that reduced pressure in the accumulator will allow the blocking spool to shutoff the flow through the implement valve and either to independently activate the motor and pump or to continue to run the motor and pump upon return of the implement lever to a neutral position. Shutting off the flow through the implement valve diverts the flow from the implement pump through the check valve to charge the accumulator. If the pressure in the accumulator exceeds a predetermined amount at the time the control member is moved or when the pressure in the accumulator reaches or exceeds a predetermined amount, the pilot plunger will shift the blocking spool to permit flow from the implement pump through the implement valve, through the blocking valve, to the tank and will shutoff the motor and pump.

The accumulator charging means has the blocking spool activated independently by means of a pressure-responsive member reacting to a decrease in pressure in the accumulator or may be activated by the control member in cooperation with the lift and/or tilt levers. The blocking spool, when in the blocking position, actuates a switch for driving the motor and pump. Therefore, when the accumulator is fully charged and the lift or tilt levers are in the neutral position, the implement motor and pump will be shutoff. The blocking spool is operative for turning on the motor and pump to charge the accumulator whenever the pressure in the accumulator is below a predetermined level whether or not one of the implement levers has been actuated.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 1 is a schematic diagram of one preferred embodiment of the invention showing the implement valve in cross section;

FIG. 2 is a perspective view of the preferred embodiment of the actuator controls in conjunction with the implement valve for the lift truck;

FIG. 3 is an enlarged elevational view of the pressure sensitive actuator of the preferred embodiment;

FIG. 4 is a schematic diagram of a modified form of the invention showing the implement valve in cross section; and, FIG. 5 is an enlarged elevational view of a pressure sensitive monitoring valve of the modified form of invention for independently operating the blocking spool.

DESCRIPTION OF THE PREFERRED EMBODIMENT

Referring specifically to FIG. 1, a closed center hydrostatic steering unit 10 is illustrated connected to a steering cylinder 12. An implement motor 14 drives an implement pump 16 which is connected by a line 18 to an implement valve 20 and blocking valve 19 to a tank 21. As illustrated, the blocking valve 19 is integral with the implement valve 20, but it is to be understood that they could be separate valves. A branch line 22 is connected to line 18 between the pump 16 and the valve 20 and is connected to supply line 24 running from the steering unit 10 to an accumulator 26. A one-way check valve 28 is positioned in the line 22 so as to permit the one-way flow of fluid from the pump 16 to the steering unit 10 and accumulator 26. A line 30 runs from the supply line 24 to a pilot plunger 32 in the implement valve 20. An electric wire 34 runs from the implement motor 14 to a source of electric power 36 through switches 38 and 40. The motor 14 could be any prime mover that is activated by elements of the implement valve 20 contacting switches 38, 40, clutches (not shown) or the like in a manner that will be described hereinafter.

Referring to the implement valve 20, a conventional relief valve spool 42 is slidably mounted in valve body 43 and spans the line 18 between the inlet 44 and the outlet 46 of the valve in the usual manner of a relief valve. The relief valve 42 is designed to dump fluid in the line 18 and valve 20 into the tank 21 on those occasions when the pressure in the valve 20 exceeds an upper predetermined limit. The relief valve 42 operates in the body 43 of the valve 20 in a conventional fashion and its operation will not be described more in detail herein.

An operating plunger or spool 48 is positioned in the body 43 of the implement valve 20 and is adapted to be physically shifted along its axis upon actuation of an appropriate control lever 49, as shown in FIG. 2 and as will be described in detail hereinafter, so as to operate the appropriate element of the lift truck by feeding fluid under pressure to the appropriate parts of the operating unit. For instance, the operating plunger 48 may be a tilt plunger or a lift plunger and, upon actuation, will feed fluid to the appropriate tilting or lifting apparatus on the lift truck.

In the illustrated form of the invention, the valve body 43 has a cavity 50 in which is slidably received the control plunger or blocking spool 52. It is to be understood that, the blocking valve 19 could have the control plunger or blocking spool 52 seated in a separate valve body between the implement valve 20 and the tank 21 without departing from the invention. The control plunger 52 has a reduced diameter portion 54 which spans the opening 55 in the line or passageway from the inlet 44 to the outlet 46 communicating with the tank 21. Adjacent the reduced diameter portion 54 are spaced apart seats or shoulders 60 and 62 with shoulder 60 being of a size to cooperate with the opening 55 in the passageway so that when blocking spool 52 is moved downward, as viewed in FIG. 1, it will close said opening 55, the flow of fluid through the passageway in the valve is thereby shutoff. The one end 56 of the blocking spool 52 includes an enlarged end portion 58 which acts as a stop for limiting the upward travel of the blocking spool 52.

The pilot plunger 32 is comprised of a housing 64 attached to the valve body 43 in axial alignment with the blocking spool 52 and has a guide spool 66 slidable in a cylinder 72 in said housing 64 with one end of the spool 66 abutting the enlarged end portion 58 of said blocking spool 52. The line 30 is connected to the housing 64 and communicates with the cylinder 72 and with the other end of the spool 66 so that pressure in the line 30 will urge the guide spool 66 against the end of the blocking spool 52 to move the blocking spool 52 to a position where the opening 55 permits fluid to flow through the implement valve 20 and past the blocking spool 52. The control plunger or blocking spool 52 has another end portion 74 slidable in the body 43 with a portion 76 reduced in cross section and integrally joined therewith in axial alignment with the axis of said control plunger or blocking spool 52. The junction between the reduced portion 76 and the end portion 74 forms shoulders 80 facing axially from said blocking spool 52. The reduced portion 76 and the end portion 74 of the blocking spool 52 are operatively encircled by a control member 82.

The control member 82 is comprised of a sleeve 84 having an internal cross section coinciding with the cross section of portion 76 on the blocking spool 52 and encircles said reduced portion 76 and has a transverse cylindricallyshaped housing 85 in which is mounted a ball 86 urged by spring 87 and adjusting screw 88 against the surfaces of either portion 74 or portion 76 of the blocking spool 52. The spring 87 urges the ball 86 against the side of the end portion 74 when the blocking spool 52 is in position with the shoulder 60 spaced from the edge of the opening 55 whereby fluid from pump 16 flows freely past the blocking spool 52. When the blocking spool 52 has been displaced so that the shoulder 60 closes the opening 55, the ball 86 will engage with the shoulder 80 and will bear against the surface of the reduced portion 76. The force of the spring 87 and the ball 86 on the shoulder 80 will hold the blocking spool 52 in position to shutoff the flow of fluid through the implement valve 20 whereby the fluid will be forced past the check valve 28 and into the accumulator 26.

When the accumulator 26 has been charged to the predetermined level, the pressure in the line 30 from the accumulator 26 to the pilot plunger 32 will force the guide spool 66 against end portion 58 of the blocking spool or control plunger 52 until the force of the spring 87 and ball 86 on shoulder 80 is overcome whereupon the blocking spool 52 will be moved upward, as viewed in FIG. 1, to open the passageway through the valve 20.

A support 89 on the control member 82 positions the switch 40 with a blade 94 in alignment with a probe 90 on the end of the end portion 76 of the blocking spool 52. When the switch blade 94 is in the raised position of FIG. 1, the switch 40 is considered to be open and no current will flow through the switch 40 to the motor 14. When the blade 94 is deflected downwardly, such as when the blocking spool 52 is in position to engage shoulder 60 with the edges of opening 55 to shutoff flow through the passageway in the valve, the switch 40 is closed and current from the source 36 will flow through the switch 40 to the motor 14.

As shown in FIG. 2, an implement control mechanism 100 is illustrated which is part of a control arrangement located in the operator's compartment of the lift truck. A vertical frame 102 is mounted on the frame of the vehicle and has a pair of spaced side plates 103,104 extending transversely therefrom. A pair of mounting blocks 105 are mounted on the plates 103,104 for supporting the ends of a shaft 106 extending through said plates. One actuating lever 49 is shown connected to an acuating shoe 108 which is rotatably mounted on shaft 106 and has an outwardly projecting bifurcated portion 110 rotatably supporting a roller 112 in rolling engagement with detent bar 114 on plate 116. When roller 112 engages in detent 118 in bar 114, the lever 49 and the operating plunger 48 connected thereto through cross pin 120 is in the neutral or non-energizing position of the control. The lever 49 is connected to plunger 48 is one of several such levers that may be used on a lift truck. The lever 49 may be a tilt lever, for tilting the fork on the truck, or may be a lift lever, for lifting the fork on the truck.

When the handle end of the lever 49 is moved toward the plane of the vertical frame 102, the shoe 108 and sleeve 122, carried by the shoe 108 are rotated relative to the shaft 106 and one part of the lever 49 engages with a stiff U-shaped plate 132. The U-shaped plate 132 has one leg 133 rigidly attached to a pivoted bracket 140, carried by a sleeve 126, which is rotatably mounted on said shaft 106. The other leg 134 of the U-shaped plate 132 is fastened to a flat side 125 of a bearing block 124, which block 124 is rotatably mounted on said shaft 106. A leaf spring 136 has one end portion mounted on the frame 102 with the other end portion bearing against the leg 134 of the plate 132 to urge said leg 134 and said plate 132 to a vertical position. Therefore, movement of the lever 49 into contact with the plate 132 will not only rotate the shoe 108 and sleeve 122 but also will rotate the pivoted bracket 140 and sleeve 126. The roller 112 on the shoe 108 rides up the side of the detent 118 in bar 114 and contacts switch 388 to start the motor 14 and pump 16 and, at the same time, the shoe 108 pulls plunger 48 upward to operate the appropriate function of the lift truck. Return of the lever 49 to the neutral position will lower the shoe 108 and break the circuit to the motor 14 and will return the roller 112 to the detent 118 with the sleeve 122 rotating relative to the shaft 106. The plate 132 and pivoted bracket 140 will not return with the lever 49 even under the urging of the spring 136 unless a predetermined condition exists, as will be described in detail hereinafter.

The pivoted bracket 140 has a radially extending bifurcated portion 138 pivotally secured by bolts 142 to the opposite sides of the vertical sleeve 84 of the control member 82. Raising the bifurcated portion 138 of the pivoted bracket 140 raises the control member 82 and support member 89 relative to the blocking spool 52 so that the ball 86 will roll up the portion 74, snap over the shoulder 80 and bear against portion 76 of the blocking spool or control plunger 52. Since the support member 89 has been moved axially relative to the blocking spool or control plunger 52, the probe 90 will permit switch blade 94 to pivot clockwise, as viewed in FIG. 1, into position to close the switch 40. At this point, both switch 38 and switch 40 are closed permitting current to flow to the motor 14 to drive the pump 16. Return of the lever 49, sleeve 122 and shoe 108 to the neutral position will open switch 38 as described hereinabove, but said return movement of the lever 49 is independent of the plate 132, pivoted bracket 140 and control member 82 so that switch 40 will remain closed as long as the resistance of the spring-urged ball 86 on the shoulder 80 and any upward force on the blocking spool or control plunger 52 by the pilot plunger 32 exceeds the force of the spring 136 on the plate 132 and on the pivoted bracket 140.

If the pressure in the accumulator 26 is lower than a predetermined value, the pilot plunger 32 will not exert sufficient upward force on the blocking spool or control plunger 52 to resist the force of the spring 136 and as a result, the spring 136 will pivot the pivoted bracket 140 and sleeve 126 about the shaft 106 forcing the control member 82 (with the ball 86 bearing on the shoulder 80 of the control plunger 52) and the blocking spool or control plunger 52 downward to close the shoulder 60 over the opening 55 in the passageway in the valve to stop the flow of fluid from the pump 16 through the implement valve 20 and the blocking valve 19. The switch 40 is still closed (blade 94 being in the dotted position of FIG. 3) passing current to the motor 14. The fluid from the pump 16 in line 18 will be forced to flow through the check valve 28 in line 22 to the steering unit 10 and to the accumulator 26. When the accumulator pressure reaches the predetermined value, the fluid in line 30 will actuate the pilot plunger 32 urging the guide spool 66 in the pilot plunger 32 upward against the blocking spool or control plunger 52 until the force overcomes the resistance of ball 86 on the shoulder 80, permitting the blocking spool or control plunger 52 to move upward past the ball 86 and at the same time to open the passageway in the valve by raising shoulder 60 from the edge of the opening 55. The probe 90 on the blocking spool or control plunger 52 will raise blade 94 on the switch 40 to open the switch, shutting off the current to the motor 14, thereby stopping the running of the motor 14 and pump 16.

By the way of summary, appropriate movement of the lever 49 will raise the plunger 48 and close the switch 38 to start the motor 14 and pump 16. The movement of plunger 48 will pass fluid to the appropriate mechanism, such as the lift mechanism for raising the fork of the truck. The lever 49 will simultaneously raise the control member 82 relative to the blocking spool or control plunger 52 to close the switch 40 and cock the detent ball 86 above the shoulder 80. When the lever 49 is returned to its neutral position, switch 38 will open. If, at that point, the pressure in the accumulator 26 is at the predetermined level, the force of spring 136 will overcome the holding force of ball 86 and spring 87 on shoulder 80, whereupon the control member 82 will ride down on the end portion 76 of the blocking spool or control plunger 52 opening switch 40 and shutting off motor 14 and pump 16. If, on the other hand, the pressure in the accumulator 26 is below the predetermined level, the pilot plunger 32 will not support the blocking spool or control plunger 52 and, accordingly, the spring 136 will drive the pivoted bracket 140 and control member 82 downward with ball 86 bearing on shoulder 80 to drive the blocking spool or control plunger 52 downward to close the passageway in the valve. The switch 40 is still closed passing current to the motor 14 to drive the pump 16 and charge the accumulator 26. When the accumulator 26 is charged, the pilot plunger 32 will raise blocking spool or control plunger 52, opening the passageway in the valve and overcoming the holding force of the spring 87 and ball 86 on the shoulder 80. The blocking spool or control plunger 52 will open the switch 40 to shutoff the motor 14 and pump 16.

An acutator member 200 is provided for automatically activating the motor 14 and pump 16 to charge the accumulator 26 whenever the pressure in the accumulator 26 falls below a predetermined level. The actuator member 200 will operate whether the implement levers 49 are operated or not. Specifically, the form of actuator member 200 shown in FIGS. 1, 2 and 3 is comprised of a housing 202 fastened through projection 204 to the side wall 104 at 206. The housing 202 has a vertically disposed portion 208 and a transversely disposed sleeve portion 210. The portion 208 has an opening 212 aligned with the probe 90 and the portion 76 of the blocking spool or control plunger 52. Slidably mounted in the portion 208 is a rod 214 which has an enlarged diameter guide portion 216 vertically slidable in opening 212. The guide portion 216 divides the rod into a projecting pin portion 218 forming a shoulder 220 with one side of said guide portion 216 and a shank 222 forming a shoulder 224 with the other side of said guide portion 216. A compression spring 226 encircles said shank 222 and extends between the end wall 228 of the housing and the shoulder 224 to urge the pin portion 218 of the rod outwardly from said housing and into contact with said probe 90 and portion 76. The shank 222 is long enough to abut against the end wall 228 if the rod 214 is urged too far into the housing. A ball and detent arrangement 230 is provided in the sleeve 210 and is comprised of an adjusting screw 232 bearing against a compression spring 234 urging a ball 236 either against the pin 218 below shoulder 220 or against the guide 216 when the rod 214 is extended.

In use, the system operates either manually, as described heretofore, or automatically. That is, in the event the pressure in accumulator 26 falls below a predetermined level and the implement levers, such as lever 49, are not being used, the force the pilot plunger 32 exerts on the blocking spool or control plunger 52 is diminished until the force of the spring 226 overcomes the force of the pilot plunger 32 and the restraining force of ball and detent arrangement 230 on the shoulder 220 whereupon the spring 226 will drive rod 214 downward to move the probe 90 and the switch blade 94 of the switch 40 from the open (solid lines of FIG. 3) to the closed position (dotted lines of FIG. 3) and, likewise, to shift the blocking spool or control plunger 52 to close the passageway through the valve. The closing of switch 40 will start the motor 14 and pump 16 to pump fluid past the check valve 28 to charge the accumulator 26. Once the pressure in the accumulator 26 has been returned to a maximum preset value, the pilot plunger 32 will drive the blocking spool or control plunger 52 upward to open the passageway in the valve and to move the probe 90 and switch blade 94 of the switch 40 to the open position thereby shutting off the motor 14 and pump 16. The upward movement of the blocking spool or control plunger 52 will move the rod 214 to a position whereby the ball 236 will snap past the shoulder 220 and seat against the pin 218 and shoulder 220 to, in effect, recock the actuator member 200 ready for the next fall in pressure of the accumulator 26.

The spring 234 is calibrated and the screw 232 is adjustable so that force of the ball and detent arrangement 230 bearing on the pin 218 may be of such a value as to delay the action of the spring 226 in driving the rod 214 downward for starting the motor 14 and pump 16. The delay or deadband is varied as desired, but is primarily designated to prevent the motor 14 and pump 16 from coming "on" and "off" too frequently and for too short a period of time.

It is to be understood that the rod 214 in the actuator member 200 will follow the switch blade 94, probe 90 and blocking spool 52 when the implement valve is actuated by movement of lever 49, sleeve 122, sleeve 126, pivoted bracket 140 and control member 82. That is, the spring 226 will overcome the force of the ball and detent arrangement 230 and will cause pin 218 on rod 214 to follow the probe 90, blade 94 and blocking spool or control plunger 52 when the accumulator pressure is down and after the lever 49 has been activated and returned to its neutral position, whereupon the spring 136 drives the pivoted bracket 140, control member 82 and control plunger 52 downward to close the passageway in the blocking valve.

A modified form of an actuator member 300 is shown in FIGS. 4 and 5 and comprises a housing 302 mounted on the frame such as on side plate or wall 104. The housing 302 has a cylindrical cavity 304 in which a guide slug or piston 306 is slidably mounted. The guide slug 306 extends beyond the housing 302 and engages with the probe 90 on control plunger or blocking spool 52 which probe is in contact with blade 94 of switch 40. The opening 304 behind the guide slug 306 is in fluid communication through line 308 with a port 310 in a housing 311 of a modulating valve 312. The housing 311 has a second port 314 communicating through a line 315 to the supply tank 21 and a third port 316 communicating through a line 318 with the line 24 running from the hydrostatic unit 10 to the accumulator 26. The modulating valve 312 has a cylindrical cavity 320 communicating through a line 322 with the pilot plunger 32. The line 322 intersects with and is in fluid communication with line 318.

The modulating valve 312 has a spool 324 with a small diameter, one end portion 326 slidable in the cylindrical cavity 320 and with a large diameter midportion 328 slidable on axially spaced lands 330 in the housing 311. The spool 324 has a spindle 332 connecting said large diameter midportion 328 with a remote large diameter end portion 334. The end portion 334 has a radially detent 336 in the outer surface thereof. A compression spring 338 is located in the housing 311 between the end of spool 324 and an adjustable threaded member 340. A ball and detent arrangement 342 is located in a sidewardly extending sleeve 344 on the housing 311 and includes an adjustable threaded member 346 urging a compression spring 348 against a ball 350 to seat the ball 350 in the radial detent 336 in the spool 324.

With the lever 49 in the neutral position and the pressure in the accumulator 26 within the predetermined range, the spool 324 in the modulating valve 312 will be in the position shown in FIG. 5 wherein the opening 304 in actuator valve 300 is in communication with the tank 21 through line 308, port 310 around spindle 332, port 314 and line 315. The pressure in the accumulator 26 will act through line 24, part of line 318 and line 322 to hold spool 324 in the modulating valve 312 in the position of FIG. 5 with the ball and detent arrangement 342 and spring 338 compressed. The same fluid pressure that is in line 322 to the modulating valve 312 will also hold the pilot plunger 32 against the control plunger or blocking spool 52 so that the passageway in the implement valve 20 will be open to tank 21 and the blade of switch 40 will be in the open position whereby the motor 14 and pump 16 are not running. The ball 86 will bear against the end portion 74 of the blocking spool or control plunger 52.

If the pressure in the accumulator 26 drops below a predetermined level, the pressure in line 322 will also be lowered, whereby the pilot plunger 32 reduces the upward force on the blocking spool or control plunger 52 and the pressure against small diameter portion 326 of spool 324 combined with the holding force of the ball 350 and detent 336 will no longer balance the force of spring 338 whereupon the spool 324 will be shifted by spring 338 to close the port 314 to tank 21 and to open the port 316 and line 318 to the accumulator 26. The ball 350 will ride upon the end portion 334 of the spool 324. The diameter of the cavity 304 in actuator member 300 is larger than the diameter of the cavity 72 in the pilot plunger 32 and the two cavities 304 and 72 communicate with each other and with accumulator 26 through line 308, across modulating valve 312, line 318 and line 322 such that the pressure in line 322 from the movement of small diameter portion 326 in the modulating valve 312 will exert a greater force on the larger diameter guide slug 306 in cavity 304 of actuator member 300 to drive the guide slug 306 downward. Movement of the guide slug 306 will move the probe 90, blade 94, control plunger 52 and pilot plunger 32 until the switch 40 is closed and the passageway through the implement valve 20 is closed by control plunger 52. The ball 86 will seat above shoulder 80 on the control plunger 52. The ratio of the diameters of the guide slug 306 in modulating valve 300 and guide spool 66 in pilot plunger 32 is such that the force needed to move the control plunger 52 and actuate switch 40 is supplied initially to the guide slug 306 from the spring 338 driven movement of small diameter portion 326 in the modulating valve 312 and then from the downward movement of the guide spool 66 of the pilot plunger 32. Movement of the blade 94 by guide slug 306 activates the motor 14 and pump 16 whereupon the pressure in the accumulator 26 is started to be built up.

When the pressure in the accumulator 26 begins to reach a predetermined maximum value, the pressure in line 322 will exert an upward force on pilot plunger 32 and on the small diameter portion 326 of spool 324 in the modulating valve 312. When the upward pressure on spool 324 exceeds the combined force of spring 338 and the force in the modulating valve 312 created by the fluid in the opening between the port 316 and port 310, the spool 324 will move upward to close off the port 316 and open the port 314 whereby the fluid in line 308 and above guide slug 306 in actuator member 300 will be in communication with tank 21 thereby reducing the downward force on guide slug 306. The ball 350 will seat in detent 336 to add measured restraint to the movement of the spool 324. With the pressure above guide slug 306 reduced, the pressure on guide spool 66 of blocking spool or pilot plunger 32 will exceed the restraining force of ball 86 on shoulder 80 of blocking spool or control plunger 52 and guide spool 66 will thereby drive the blocking spool or control plunger 52 upward to open the passageway in the implement valve 20 and to raise the switch blade 94 to open the switch and shutoff the motor 14 and pump 16.

The spring 87 urges ball 86 in engagement with detent shoulder 80 in such a way as to set the upper limit of pressure in the accumulator 26 at which the pump 16 will be shutoff which upper limit is relative to the lower limit created by the pressure of the ball and detent arrangement 342 bearing on spool 324 at which the pump 16 will be turned on. The range of pressure between the upper and lower limits is the deadband range which can be varied by varying the limits whereby the motor 14 and pump 16 are turned on and off.

The actuator members 200 and 300 are operative to actuate the motor 14 and pump 16 to charge the accumulator 26 whenever the pressure in the accumulator 26 falls below a predetermined level no matter whether or not any of the implement levers are being used. In this way, the system will always have adequate available fluid under pressure without the motor 14 and pump 16 running constantly as was the case heretofore.

I claim:

1. In a hydraulic system having a prime mover, a pump driven by said prime mover, an accumulator, a supply tank, a control connected to said accumulator, an implement actuating valve between the pump and the tank, a check valve permitting flow from the pump to the accumulator, means for closing the flow from the pump to the tank, holding means for holding said first-named means in the open position, means slidably carried on said first-named means and having spring means for retaining said slidable means in one of at least two positions relative to said first-named means, a switch carried by said slidable means and selectively activated by said first-named means whereby closing of said switch will run said prime mover and pump, and means for moving said first-named means to a blocking position upon the pressure in said accumulator falling below a predetermined level.

2. In a hydraulic system as claimed in claim 1 wherein a lever is operatively connected to said slidable means for moving said slidable means in one direction relative to said first-named means, said spring means comprising a spring-urged ball and detent whereby said ball engages said detent when said slidable means is in an upper extreme position relative to the first-named means, whereby low pressure in the accumulator will permit the slidable means to drive the first-named means to a position to block the flow through the implement valve and to close the switch whereby the prime mover and pump will charge the accumulator and upon the pressure in the accumulator reaching a predetermined level, the holding means will move the first-named means to unseat the ball from the detent, to open the flow through the implement valve and to close the switch and shutoff the prime mover and pump.

3. In a hydraulic system as claimed in claim 1 wherein said last-named means comprises a spring-urged member associated with said first-named means and being held in a retracted position by a second spring means and by the holding means whereby the lowering of the pressure in the accumulator below a predetermined level reduces the holding force of said holding means on said first-named means and permits said spring-urged member to overcome said second spring means to move the first-named means to fluid blocking position and to activate the switch for running the prime mover and pump.

4. In a hydraulic system as claimed in claim 1 wherein said last-named means comprises a movable slug associated with said first-named means, a modulating valve in communication with said accumulator, said slug, said tank and said holding means for holding said first-named means in open position, a spring-urged spool in said modulating valve having one end in communication with said accumulator, a spring-urged ball engaging either a detent or a wall of said spring-urged spool whereby said spring-urged ball in said detent and the pressure in said accumulator holds said spring-urged spool in position to exhaust said slug to tank, and whereby pressure of a predetermined lower level in said accumulator will permit the spring to urge said spool axially to displace the ball from the detent in the spool and to establish fluid communication between the accumulator, the holding means and the slug whereby pressure differential between the end of the spring-urged spool and the slug will drive the slug to move the first-named means to closed position and will activate the prime mover and the pump.

5. In a hydraulic system having a pump driven by a motor, an implement valve between the pump and a tank, check valve means permitting flow from the pump to an accumulator, accumulator charging means associated with said implement valve for closing the flow from the pump to the tank, means for holding said charging means in the open position, control means on said charging means, means for retaining said control means in one of at least two positions relative to said blocking means, a switch carried by said control means and selectively activated by said charging means whereby closing of said switch will run said motor and pump, and means operative upon reduction of pressure in said accumulator for moving said charging means to a blocking position and for closing the switch to actuate said motor and pump.

6. In a hydraulic system as claimed in claim 5 wherein lever means are provided for activating an implement function, said lever means also activates a means for subsequently activating said charging means if the pressure in the accumulator is below a predetermined level after the implement function has terminated operation.

7. A hydraulic system having a motor, a pump driven by said motor, an accumulator, a supply tank, a control unit, an implement valve having a housing, a first conduit connecting said pump to a passageway through said housing of said valve and being connected to said tank, a second conduit connecting said control unit to said accumulator, and a check valve for permitting flow from the first conduit to the second conduit, a charging valve associated with said implement valve for closing or opening said passageway through said implement valve, a pilot plunger associated with said charging valve, means connecting said accumulator to said pilot plunger, and means for moving said charging valve to a blocking position upon the pressure in the accumulator falling below a predetermined level.

8. In a hydraulic system having a prime mover, a pump driven by said prime mover, an accumulator, a supply tank, a control unit, an implement valve having a housing, said pump being connected by a passageway through said housing to said tank, said control unit being connected to said accumulator, and a check valve for permitting flow from the said pump to said accumulator, in combination, an accumulator charging valve having a blocking spool for closing or opening said passageway through said housing, a pilot plunger in communication with said accumulator and carried by said charging valve for holding said blocking spool in open position when said pressure in the accumulator is at a predetermined level, control means carried by said charging valve for movement with, as well as for movement relative to said blocking spool, a switch operated by said control means for actuating said prime mover and pump, and means for moving said blocking spool to a blocking position upon the pressure in the accumulator falling below a predetermined level whereby the switch will be activated to start the primer mover and pump.

9. In a hydraulic system as claimed in claim 8 wherein said last-named means comprises a slug associated with said blocking spool and movable in a cavity, a modulating valve in communication with said accumulator, said cavity and said pilot plunger, a spring-urged spool in said modulating valve having one end in communication with said accumulator, resilient means engaging said spring-urged spool in one of two positions whereby said resilient means and the pressure in said accumulator holds said spring-urged spool in position to exhaust said cavity to tank, and whereby pressure of a predetermined lower level will permit said spring-urged spool to be moved to the second position to establish communication between the accumulator, pilot plunger and cavity to drive the slug, to move the blocking spool to closed position, and to activate the prime mover and pump.

10. In the hydraulic system of claim 9 wherein the implement valve includes at least one implement spool for activating an implement function, a lever, said implement spool being operatively connected to said lever and a second switch actuated by said implement spool when said lever activates said implement spool whereby movement of said lever initially activates the prime mover, the pump and the implement function through activation of said implement spool.

11. In the hydraulic system of claim 10 wherein said lever is moved to return said implement spool to a position to cutoff the implement function and to open said second switch, said return of said lever being independent of said control means carried on said blocking spool, means bearing on said control means carried on said blocking spool for urging said blocking spool toward the blocking position in the valve whereby when the force of the pilot plunger for holding said blocking spool in the open position is overcome by said means bearing on said control means, the blocking spool will be moved to close the flow through the valve and the first-named switch will be closed to drive the prime mover and pump.

12. In the hydraulic system of claim 9 wherein said resilient means engaging said spring-urged spool is a spring-urged ball engaging in a detent for resisting movement of said spring-urged spool.

13. In the hydraulic system of claim 8 wherein said last-named means comprises a spring-urged member associated with said blocking spool and being retained in retracted position by resilient means and by the holding means whereby pressure in the accumulator below a predetermined level permits the spring of the spring-urged member to drive the member and the blocking spool to a position to block flow through the valve and to activate the prime mover and pump to charge the accumulator.

14. In the hydraulic system of claim 13 wherein said resilient means comprises a spring-urged ball engaging selectively a detent shoulder on said member and a wall of said member.

15. A control member, a valve spool, said control member slidably carried on said valve spool, a retaining means for retaining said control member in one of at least two positions relative to said valve spool, actuation means operatively connected to said control member for moving said control member in one direction only relative to said valve spool until said retaining means engages with an abutment, resilient means urging said control member and said valve spool in a direction opposite to the direction of movement by said actuation means, and means for independently moving said valve spool in a direction opposite to the direction of movement by said actuation means.

16. In a control member as claimed in claim 15 wherein said means for independently moving said valve spool is a resilient means.

17. In a control member as claimed in claim 15 wherein said means for independently moving said valve spool is responsive to a pressure drop acting on said valve spool.

18. In a control member as claimed in claim 15 wherein said means for independently moving said valve spool moves said valve spool to a blocking position upon the pressure in an accumulator falling below a predetermined level.

19. A control member, a valve spool, an accumulator, a pump for charging said accumulator, a switch for activating and deactivating said pump, said control member slidably carried on said valve spool and having retaining means for retaining said control member in one of at least two positions relative to said valve spool, a lever operatively connected to said control member for moving said control member in one direction only relative to said valve spool until said retaining means seats on an abutment on said valve spool and said pump is activated by said switch, resilient means urging said control member and said valve spool in a direction opposite to the direction of movement by said lever, said accumulator being connected to said valve spool, and means for moving said valve spool to a blocking position upon pressure in the accumulator falling below a predetermined level.

20. In a hydraulic system as claimed in claim 19 wherein said last-named means comprises a spring-urged member associated with said valve spool and being held in a retracted position by a second spring means and by pressure in the accumulator whereby the lowering of the pressure in the accumulator below a predetermined level reduces the holding force on said valve spool and permits said spring-urged member to overcome said second spring means to move the valve spool to fluid blocking position and to activate the switch for running the pump.

21. In a hydraulic system of claim 19 wherein said last-named means comprises a spring-urged member associated with said valve spool and being retained in retracted position by resilient means and by the pressure in the accumulator whereby pressure in the accumulator below a predetermined level permits the spring of the spring-urged member to drive the member and the valve spool to a position to activate the pump to charge the accumulator.

22. A control member, a valve spool, said control member slidably carried on said valve spool, a retaining means for retaining said control member in one of at least two positions relative to said valve spool, a lever operatively connected to said control member for moving said control member in one direction only relative to said valve spool until said retaining means engages with an abutment, resilient means urging said control member and said valve spool in a direction opposite to the direction of movement by said lever and second resilient means responsive to a drop in pressure in the system for moving said valve spool in said direction opposite to the direction of movement by said lever.

* * * * *